Feb. 27, 1968 J. L. MASURE 3,371,319

STORED PROGRAM, COMMON CONTROL, SELECTING SYSTEM

Filed Oct. 28, 1964 2 Sheets-Sheet 1

Feb. 27, 1968 J. L. MASURE 3,371,319

STORED PROGRAM, COMMON CONTROL, SELECTING SYSTEM

Filed Oct. 28, 1964 2 Sheets-Sheet 2

United States Patent Office 3,371,319
Patented Feb. 27, 1968

3,371,319

STORED PROGRAM, COMMON CONTROL, SELECTING SYSTEM

Jean Louis Masure, Wilrijk-Antwerp, Belgium, assignor to International Standard Electric Corporation, New York, N.Y., a corporation of Delaware Filed Oct. 28, 1964, Ser. No. 407,120
Claims priority, application Netherlands, Nov. 6, 1963, 300,173
12 Claims. (Cl. 340—172.5)

ABSTRACT OF THE DISCLOSURE

A centralized, electronic, data processing common control circuit has need for making reference to a particular stored program responsive to the receipt of signals representing the "address" of that program. Each address has two parts which are separately processed. One part represents pieces of hardware, and the other part represents the function expected to be performed by (or for) the hardware. The two address parts are compared to be certain that the hardware identified by the one part of the address can perform (or requires) the function identified by the other part of the address. If there is no match, the hardware address is changed a bit at a time until there is a match. Then, the newly identified hardware may be selected by any suitable means.

Figure 1:
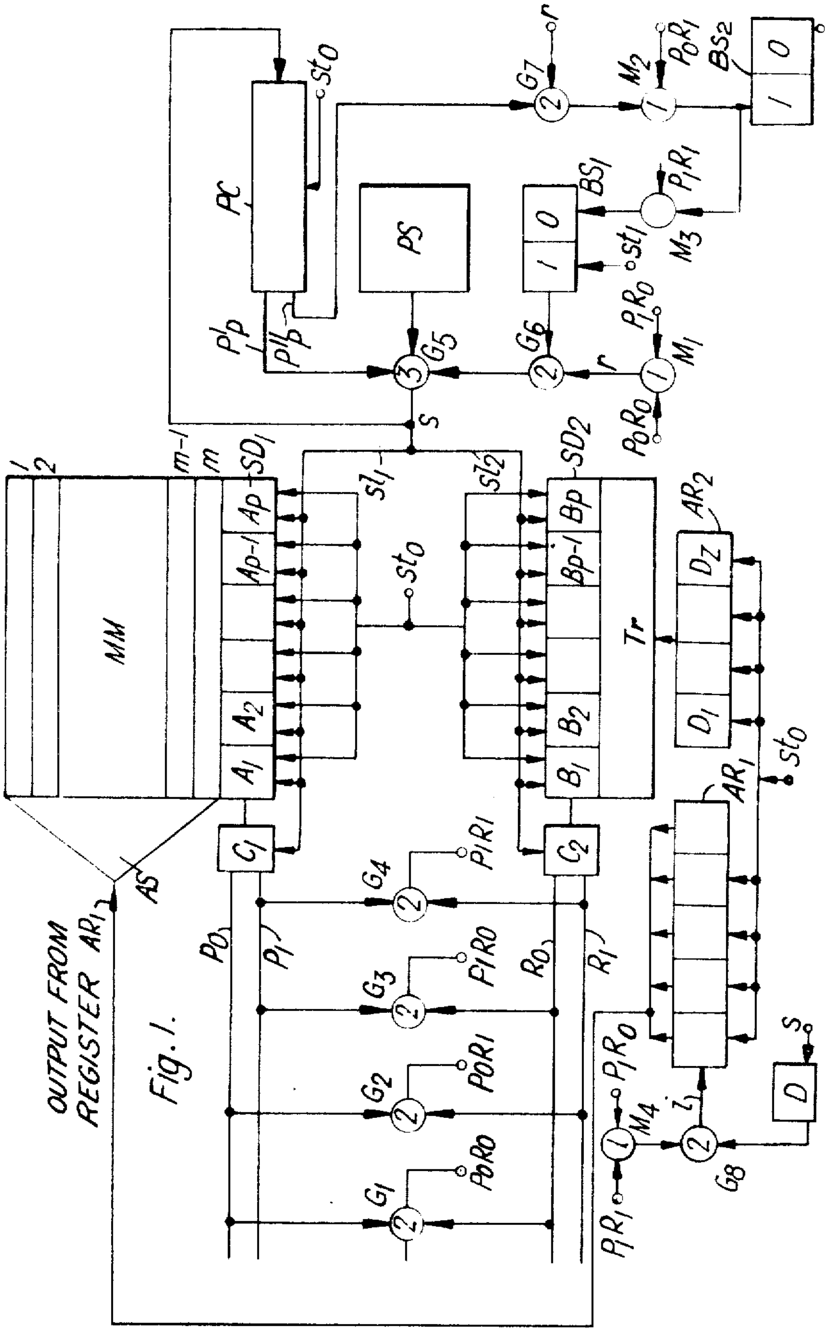

The present invention relates to a selecting system.

A data processing system provides various logical circuits which are able to request the intervention of a common control circuit. When such an intervention request has been granted, the identity of the requesting logical circuit and the reason, or stop condition, for which a request has been originated are combined so as to constitute a selecting address for interrogating a programme store. This may, for instance, be performed as described hereinafter.

When there are $m$ different logical circuits and $p$ possible different stop conditions, the identity of each of these logical circuits may be coded in a binary manner in a $y$-digit code out of $m(2^{y-1}<m\leqslant 2^y)$ code possibilities. Likewise the stop conditions may be coded in a binary way in a $z$-digit code out of $p(2^{z-1}\leqslant p\leqslant 2^z)$ code possibilities. The various, e.g. $n$, selecting addresses may then be formed by associating each identity code of a logical circuit with the code of one of the $p$ reasons for which this logical circuit may request an intervention of the common control circuit.

Each logical circuit may in general request an intervention of the common control circuit only for some of the $p$ possible reasons, e.g. the first, second, . . . , $m$th logical circuits are able to originate a request for a number $p_1, p_2 \ldots p_m$ of reasons respectively. The sum $n$ of these numbers is much smaller than the product $mp$. In order to be able to address the above programme store with these $n$ selecting addresses, it would seem to be sufficient to provide the selecting system, at the moment of its installation, with a selecting means comprising $n$ concidence gates. Each having $y+z$ inputs. The $y$ inputs characterize the identity of the requesting logical circuit. The $z$ inputs characterize the reason for which the request has been originated. However, the selecting means must be sufficiently flexible in order that it might still be used when the above numbers $p_1$ to $p_n$ are modified or when the conditions for which each logical circuit may request an intervention are replaced by others. In order to have a flexible selecting system, the selecting means must be provided with $mp$ coincidence gates each with $y+z$ inputs. Hence when $mp$ is large, such a selecting means includes a large number of gates and is correspondingly expensive.

It is, therefore, an object of the present invention to provide an improved selecting system which does not present this drawback.

The present selecting system is characterized in that it includes:

A first address register (AR1), for storing a first address part of a selecting address out of a number of $n$ selecting addresses having a first and a second address part. The first address part consists of a code part of a predetermined set of $m(m<n)$ distinct code possibilities;

A second address register (AR2) for storing said second address part of said selecting address. There are $p$ different second address parts each coded in a code out of $p$ distinct code possibilities;

A memory device (MM) including a plurality of $m$ sets of $p$ bistate devices. Each bistate device corresponds to one of said $p$ second address parts;

Selecting means (AS) for selecting, under the control of the code of the first address part stored in said first address register, a corresponding set of $p_1$ bistate devices out of said $m$ sets of $p$ bistate devices. There are $p$ bistate devices of the corresponding selected set in a predetermined binary state when the second address part constitutes together with said first address part stored in said first address register one of said $n$ selecting addresses;

Comparison means for comparing the conditions of the $p$ bistate devices of said selected set with the code stored in said second address register;

And logical means for modifying the code stored in said first address register. There are a number of modifications in accordance with the number of times $q(1\leqslant q\leqslant p_1)$ that said comparison means have found said predetermined binary state registered in the bistate devices of said selected set. These modifications continue until the bistate device of this set corresponds to the code of the second address part stored in said second address register.

Figure 2:
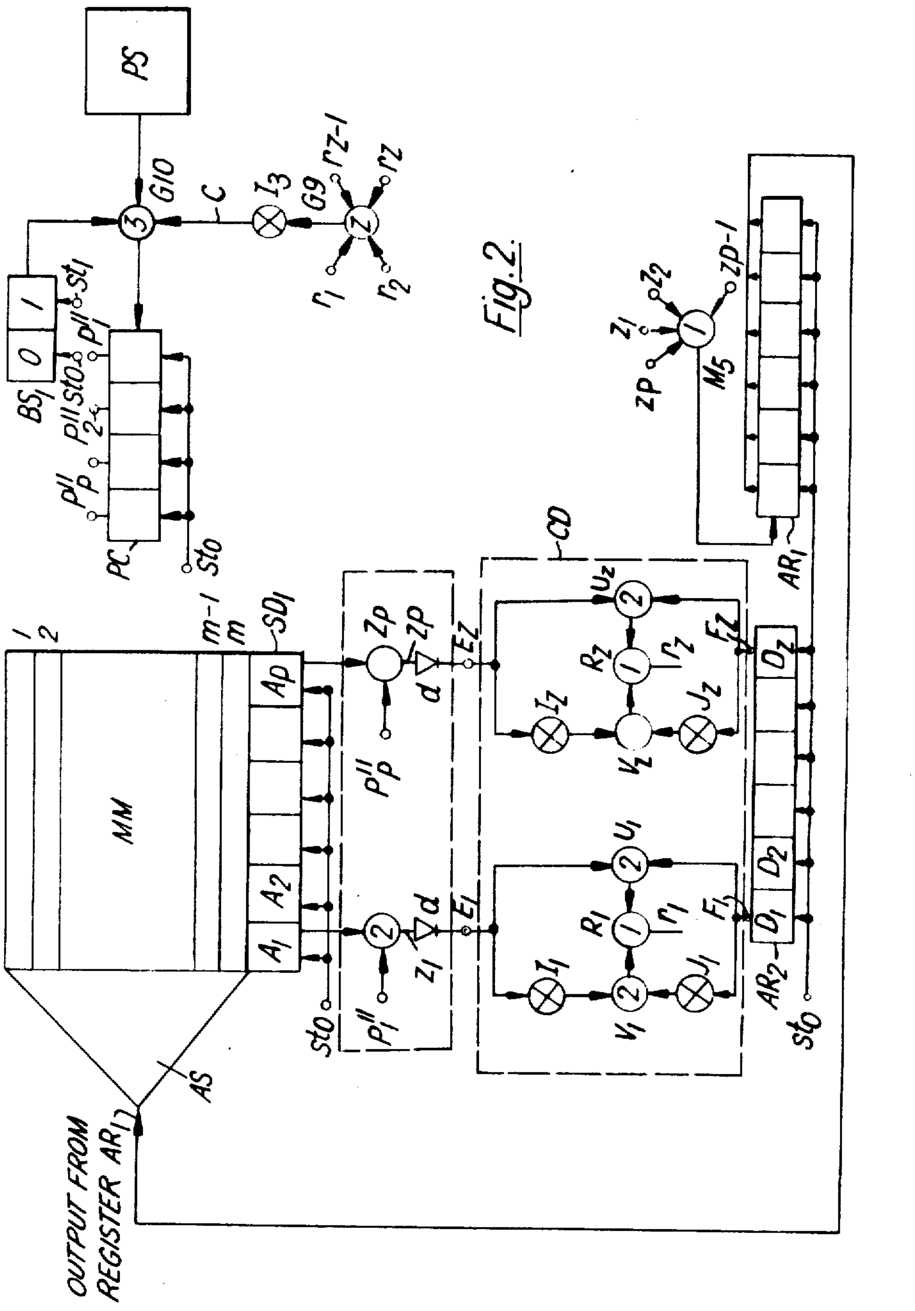

The above mentioned and other objects and features of the invention will become more apparent and the invention itself will be best understood by referring to the following description of embodiments taken in conjunction with the accompanying drawings in which:

FIG. 1 is a schematic diagram of a first embodiment of the selecting system according to the invention; and FIG. 2 is a schematic diagram of a second embodiment of this selecting system.

The drawing follows the well known and often used convention of showing logic symbols to represent the circuit components. Those who are skilled in the art will readily perceive any of the many circuits which may be used to provide the actual hardware. To obtain a more general discussion of the subject, reference may be made to either of the books "Understanding Digital Computers" by Seigel or "Logical Design of Digital Computers" by Phister, both published by John Wiley and Sons.

It is again supposed that there are $n$ different selecting addresses, each of which corresponds to a programme word and each of which is constituted by a first address part associated with a second address part. It is moreover assumed that there are $m$ different first address parts. Each first part is coded in a binary $y$-digit code and $p$ different second address parts each coded in a binary $z$-digit code.

Principally referring to FIG. 1, MM is a memory matrix and more particularly a semi-permanent capacitive store of the type disclosed in the co-pending U.S. application S.N. 845,362 filed Oct. 9, 1959. It includes $m$ rows numbered 1 to $m$ and $p$ columns. Each row comprises a set of $p$ bistate devices. All of the $p$ bistate devices of a single row correspond to a same first address part of a selecting address. Whereas, all of the $m$ bistate devices of a single column correspond to a same second address part of a selecting address. A bistate device of the memory matrix is in its 1-condition when the second address part corresponding to its column forms, together with the first address part corresponding to its row, one of the above $n$ possible selecting addresses. In other words, some of the bistate devices of each row which are in the 1-condition to indicate the second address parts. Together with the same first address part, these second parts correspond to this row. This completes the selection of the addresses out of the $n$ possible selecting addresses.

A row of the memory matrix MM may be selected by the selecting means or access selector AS. This selector operates under the control of the code of the first address part of the corresponding selecting address. This first address part is stored in a first address register AR1, whereas the second address part of this selecting address is stored in a second address register AR2 comprising $z$ bistate devices D1 to D$z$.

A storage device SD1 is associated with the memory matrix MM. This storage devices SD1 is constituted by a set of $p$ bistate devices A1 to A$p$. When the $p$ bistate devices of a selected row are read-out by any suitable read-out means (not shown) forming part of the access selector AS, the conditions of the $p$ bistate devices of this row are stored in the corresponding $p$ bistate devices A1 to A$p$ of the storage device SD1.

The above first address register AR1 controls the access selector AS, as already mentioned. Whereas, the second address register AR2 is coupled via a translating device T$r$ to a storage device SD2 which is constituted by a set of $p$ bistate devices B1 to B$p$ each of which corresponds to one of the $p$ second address parts. Each of these bistate devices is set, by the translating device T$r$, to its 1-condition when the corresponding second address art is stored in the second address register AR2. The translating device T$r$ is constituted by a well known and obvious gating circuit and is therefore not shown in detail.

In order to be able to compare the condition of the bistate devices A1 to A$p$ with the conditions of the bistate devices B1 to B$p$, a comparison device is provided. It comprises the bistate devices C1 and C2 and the four two-input coincidence gates G1 to G4. P0, R0 are the 0-outputs and P1, R1 are the 1-outputs of the bistate devices C1 and C2 respectively. The coincidence gates G1 to G4 are conditioned by the pairs of output leads P0, R0; P0, R1; P1, R0 and P1, R1 respectively. By inspection of the connections between conductors P0, P1, R0, R1 and the gates G1–G4, it is seen that the outputs of these gates are indicated by P0R0, P0R1, P1R0 and P1R1 respectively.

The bistate device C1 and the bistate devices A1 to A$p$ are arranged as a shift register having a shift lead S/1. Also the bistate device C2 and the bistate devices B1 to B$p$ are arranged as a shift register having a shift lead S/2. The shift leads S/1 and S/2 are joined together and connected to the output of the three-input coincidence gate G5 having a first input connected to the output of the pulse source PS, a second input connected to the output $p^1_p$ of the binary counter PC, and a third input connected to the output of the two-input coincidence gate G6. The binary pulse counter PC (which is of a well known type) is able to count $p$ and its output $p_0$ is normally activated and is deactivated when the counter has reached its $p$th position. The output $p''_p$ of this counter, on the contrary, is normally deactivated and is activated when the counter has reached this $p$th position. The output of the coincidence gate G5 is also connected to the input of the binary pulse counter PC. The output $p''_p$ of counter PC is connected to one input of the two-input coincidence gate G7. The other input of gate G7 is connected to the output $r$ of the two-input OR gate or mixer M1. The output of this coincidence gate G7 is connected to one input of the two-input mixer M2. The other input of this mixer M2 is connected to the output P0R1 of the coincidence gate G2. The output of this mixer M2 is connected to the 1-input of the error bistate device BS2 and to one input of the two-input mixer M3. The other input of mixer M3 is connected to the output P1R1 of the coincidence gate G4.

The three-input coincidence gate G6 has one input connected to the 1-output of the start bistate device BS1, the 0-input of which is connected to the output of the mixer M3 and the 1-input of which is connected to a start input lead $st1$. The other input of the coincidence gate G6 is constituted by the output $r$ of the two-input mixer M1, the inputs of which are connected to the outputs P0R0 and P1R0 of the coincidence gates G1 and G3 respectively.

The first address register AR1 is arranged as a well known binary counter, the input $i$ of which is connected to the output of the two-input coincidence gate G8. The inputs of this coincidence gate G8 are connected to the outputs S of the coincidence gate G5 via the delay unit D and to the output of the two-input mixer M4, respectively. The inputs of this mixer M4 are connected to the outputs P1R0 and P1R1 of the coincidence gates G3 and G4 respectively. The delay time T provided by this delay unit D is equal to half the time interval elapsing between two successive shift pulses.

The storage devices SD1 and SD2, the address registers AR1 and AR2, and the binary pulse counter PC each have a reset lead S$t$0.

The above described system operates as follows.

At the start of a selecting operation a reset pulse is applied to the reset leads S$t$0 in order to reset the bistate devices A1 to A$p$, B1 to B$p$, BS2, C1 and C2, the address registers AR1 and AR2, and the pulse counter PC to their 0-condition. Due to this, the output P0R0 of the coincidence gate G1 is activated but this remains without effect on the other parts of the system.

The first and the second address parts of a selecting address are then stored in the first and second address registers AR1 and AR2, respectively. By means of the first address part, the access selector AS selects the corresponding row in the memory matrix MM and reads out the conditions of the $p$ bistate devices included in this selected row. These conditions are stored in the corresponding $p$ bistate devices A1 to A$p$ of the storage device SD1. It should be noted that $p_i$ of the $p$ bistate devices A1 to A$p$ are thus brought in their 1-condition. The $p_i(p_1, p_2 \ldots p_m)$ second address parts, corresponding to these $p_i$ bistate devices forms, together with the first address part stored in the first address register AR1, $p_i$ selecting addresses among the $n$ possible selecting addresses.

The second address part, stored in the second address register AR2, is translated by the translator T$r$. The result thereof is stored in the $p$ bistate devices B1 to B$p$ of the storage device SD2 i.e. the bistate device corresponding to this second address part is triggered to its 1-condition.

When these operations are finished, a start pulse is applied to the 1-input $st1$ of the start bistate device BS1 which is thus triggered to its 1-condition so that its 1-output is activated.

In order to be able to compare the corresponding first bits of the codes stored in the storage devices SD1 and SD2, a shift pulse is applied to the shift leads $s/1$ and $s/2$ in the following manner. Due to the output P0R0 of the coincidence gate G1 and hence of the mixer M1 being activated and due to the bistate device BS1 being in its 1-condition, the output of the coincidence gate G6 which constitutes one input of the coincidence gate G5 is activated. Since the output $p_0$ of the binary pulse counter PC is also activated, a pulse generated by the pulse source PS is applied, via the coincidence gate G5, to the shift leads $s/1$ and $s/2$ of the storage devices SD1, SD2. Responsive thereto the conditions of the bistate devices A1 and B1 are shifted to the bistate devices C1 and C2 respectively. This same pulse also steps the binary pulse counter PC by one step. When after this first shifting operation, and in general after each shifting operation, the outputs P0 and R0 of the bistate devices C1 and C2 are both activated, another shift pulse is applied to the shift leads *sl*1 and *sl*2 in the manner described above in order to compare the corresponding following bits of the codes stored in the storage devices SD1 and SD2.

If the output of the coincidence gate G1 is still activated after *p* shift pulses have been applied to the storage devices SD1 and SD2, it means that the contents of both these storage devices are entirely constituted by 0-bits. This is obviously an erroneous condition. In this case the shifting operation is stopped, and the error is indicated in the following manner. When the binary pulse counter PC has reached its final or *p*th position, after the *p*th shift pulse has been applied to the storage devices SD1 and SD2, its output $p'_p$ is deactivated to block the gate G5. The output $p''_p$ of the binary pulse counter PC and the output *r* of the mixer M1 are both activated, so that the coincidence gate G7 is activated. Consequently the error bistate device BS2 is triggered in its 1-condition via the mixer M2, and the start bistate device BS1 is reset to its 0-condition via the mixer M3.

After the shifting operation, if the output P0R1 of the coincidence gate G2 is activated, it means that the bistate devices C1 and C2 are in their 0-condition and 1-condition respectively. In other words, it means that the second address part stored in the bistate device C1 is not registered in the bistate device C2. Either the condition of the bistate device A1 or of the bistate device B1 is erroneous. In this case, the shifting operation is stopped, and the error is indicated in the following manner. The output *r* of the mixer M1 is deactivated due to the output P0R1 of the coincidence gate G2 being deactivated. The outputs of the gates G6 and G5 are also deactivated. Hence, a shifting operation is not possible. The error bistate device BS2 is triggered in its 1-condition via the mixer M2 by the activated output P0R1 of the coincidence gate G2.

After a shifting operation, if the output P1R0 of the coincidence gate G3 is activated, it means that the bistate devices C1 and C2 are in their 1-condition and 0-condition respectively. In other words, the second address part stored in the bistate device C1 is not registered in the bistate device C2. In order to permit the comparison of the following corresponding digits of the codes stored in the storage devices SD1 and SD2 a shift pulse is applied to the shift leads *sl*1 and *sl*2 in the following manner. Due to the output P1R0 of the coincidence gate G3 being activated and since the start bistate devices BS1 is in its 1-condition, the output of the coincidence gate G6 is activated. As the output $p'_p$ of the counter PC is also activated, a pulse generated by the pulse source PS is applied to the shift leads *sl*1 and *sl*2. A 1-bit is further added to the code of the first address part stored in the first address register AR1. Indeed, the output P1R0 of the coincidence gate G3 being activated, the output of the mixer M4 is also activated. Thus at the moment when the output of the delay unit D is activated, the output of the coincidence gate G8 is also activated. Due to this, the first address register AR1 is advanced by one step. When the output P1R0 of the coincidence gate G3 is activated at the end of a complete comparison operation (i.e. after *p* shift pulses have been applied to the storage devices SD1 and SD2) there is an error, since the output of the coincidence gate G4 has to be activated once during a shifting operation. Indeed, the 1-condition stored in one of the bistate devices B1 to B*p* must necessarily also be registered in the corresponding bistate device of the bistate devices A1 to A*p*. The error is registered if, at the end of the comparison operation, the output $p''_p$ of the pulse counter PC is present to trigger the bistate device BS2 to its 1-condition via the coincidence gate G7 and the mixer M2.

Finally, if after a shifting operation the output P1R1 of the coincidence gate G4 is activated, it means that the bistate devices A1 and B1 are both in their 1-conditions. In other words, there is a correct detection if the bistate device, among the bistate devices A1 to A*p*, in the 1-condition corresponds to the bistate device, among the bistate devices B1 to B*p*, which is also in its 1-condition. In this case no further shift pulses are applied to the storage devices SD1 and SD2. Indeed, the output lead P1R1 is activated, due to which the output *r* of the mixer M1 is deactivated so that the coincidence gate G5 is blocked. A 1-bit is further added added to the code of the first address part stored in the first address register AR1. Indeed, the output of the mixer M4 is activated so that at the moment the output of the delay unit D is activated the output of the coincidence gate G8 is also activated. Due to this the contents of the first address register AR1 are advanced by one step.

From the above it follows that a 1-bit is added to the code of the first address part stored in the first address register AR1 each time a 1-condition is found registered in the first storage device SD1. The process of adding 1-bit repeats itself until the bistate device of this first storage device corresponding to the code of the second address part stored in the second address register has been found in the 1-condition.

When to the first, second . . . *m*th first address parts there may be associated $p_1, p_2 \ldots p_m$ second address parts respectively, so as to form in total $$p_1+p_2+ \ldots +p_m=n$$

different selecting addresses, the above described selecting system transforms the initial first address part of each set of $p_1(p_1 \ldots p_m)$ selecting addresses, having a same initial first address part, by adding 1, 2 . . . $p_1$ bits in 1, 2 . . . $p_1$ steps to the code of this initial first address part. Thus there are formed for each initial first address part a series of $p_1$ successive transformed first address parts forming together with this initial first address part a series of $1+p_1$ sucessive first address parts. The above described selecting system provides in total $m+n$ initial and transformed first address parts. It is clear that in order that two of these first address parts should not be identical, the code of an initial first part must be able to be derived from the code of the immediately preceding initial first address part, to which may be associated $p_1$ second address parts, by adding at least $1+p_1$ 1-bits. Hence the *m* initial first address parts must be coded in a code part of a predetermined set of *m* distinct code possibilities. As mentioned in the introductive part of the present description, it may happen that one or more of the number $p_1$ to $p_m$ must be modified. When calling $p'$ the maximum value of the number $p_1$ to $p_m$, i.e. when maximum $p'$ second address parts may be associated with each first address part, the difference between the code of two successive first address parts is taken equal to $1+p'$, wherein $p'$ is much smaller than $p(2^{z'-1}<p'\leqslant 2^{z'}$ and $z'$ smaller than $z)$.

The *n* transformed first address parts are used as new selecting addresses for selecting the corresponding programme words. These programme words may be stored in the memory matrix MM or in another memory matrix MM' (not shown).

In the first case, each of the *m* rows of the memory matrix MM has to be followed by a set of $p'$ rows. The $p_1$ ($p_1$ to $p_m$) first rows of matrix MM are used for storing the programme words of the corresponding $p_1$ new selecting addresses. The following $p'-p_1$ rows of matrix MM are spare rows adapted to store other programme words when the numbers $p_1$ to $p_m$ are modified.

In the second case, the other memory matrix MM' must comprise $mp'$ rows arranged in the same manner as in the foregoing case i.e. each set of $p'$ rows comprises $p_1$ rows for storing programme words corresponding to $p_1$ new selecting addresses and $p'-p_1$ spare rows.

In both of the above first and second cases, there are provided $m+mp'$ rows so that the binary code of the selecting addresses giving access to these rows must comprise $u$-bits when $2^{u-1}<m+mp'\leqslant 2^u$. Hereby $u=y+z'+1$, since $2^{y+z'}<m+mp'=m(1+p')<2^{y+z'+1}$. Therefore, in the above first case, the selecting means or access selector of the memory matrix MM must comprise $m+mp'$ coincidence gates with $u$ inputs, while in the second case the access selectors of the memory matrixes MM and MM' must comprise $m$ coincidence gates with $u$ inputs and $mp'$ coincidence gates with $u$ inputs respectively. In both cases there are hence $m(1+p')(y+z'+1)$ inputs in total. This number is much smaller than the number of inputs $mp(y+z)$ included in the selecting means of a selecting system described in the introductive part of the description. Indeed $1+p'$ and $z'+1$ are much smaller than $p$ and $z$ respectively. Hence the present selecting means is less expensive than the known selecting means.

Instead of proceeding in the manner described above, the selecting system may also be arranged in such a manner that it transforms the initial first address part of each set of $p_1$ selecting addresses having a same initial first address part by adding 0, 1 . . . $p_1$-1 $q$ bits in 1, 2 . . . $p_1$ steps to the code of the initial first address part. Thus there are formed for each initial first address part a series of $p_1$ successive first address parts, i.e. an initial first address part and $p_1$-1 transformed first address parts. In total a thus arranged selecting system provides $n$ transformed first address parts. These $n$ transformed first address parts are also used as new selecting addresses for selecting corresponding programme words. In this case it is impossible to use the memory matrix MM since $m$ of the $n$ new selecting addresses are identical to the $m$ first address parts of the initial $n$ selecting addresses. Therefore one has to provide another memory matrix MM' with $mp'$ rows and an associated access selector with $mp'$ coincidence gates having $y+z'$ or $y+z'-1$ inputs each. Indeed $2^{y+z'-2}<mp'\leqslant 2^{y+z'}$.

In the above described selecting system the code of an initial first address part is modified by adding thereto $p_1$ or $p_1$-1 bits in $p_1$ steps. Instead of proceeding in this manner one may obviously also add, during each step, a number of bits which is different from or equal to 1. When to each new selecting address there corresponds a programme word which may be stored in e.g. $r$ rows of the above memory matrix MM, it is for instance advantageous to design the selecting system in such a manner that the codes of the first, second, third . . . $p_1$th new selecting addresses may be derived from the code of the initial first address part by adding 1, $r$, $r$ . . . $r$ bits thereto during the first, second, third . . . $p_1$th step. Indeed, the programme words may then each be stored in $r$ successive rows of the memory matrix MM.

In the above described embodiment shown in FIG. 1, the second address part code stored in the second address register AR2 is translated before being compared with the conditions of the $p$ bistate devices A1 to A$p$ of the storage device SD1.

In the embodiment shown in FIG. 2, the conditions of the bistate devices A1 to A$p$ are successively translated in the $z$-bit binary code. The second address part is coded, before being successively compared with the code of this second address part stored in the second address register.

This second embodiment comprises a memory matrix MM, an access selector AS, a storage device SD1, first and second address registers AR1 and AR2 and a binary pulse counter PC. All these devices are identical to those indicated by the same reference in FIG. 1.

The 1-outputs of the bistate devices A1 to A$p$ of the storage device SD1 are connected to the first inputs of the two-input coincidence gates Z1 to Z$p$ respectively. These gates form part of a translator T$r'$ and have second inputs which are connected to the outputs $p''_1$ to $p''_p$ of the binary pulse counter PC which is able to count $p$. The outputs $p''_1$ to $p''_p$ are successively activated when the counter PC is stepped from its first to its $p$th position.

The outputs $z1$ to $zp$ of the coincidence gates Z1 to Z$p$ are each connected through diodes $d$ to a number of inputs among the $z$ first inputs E1 to E$z$ of a comparison device CD. The number of first inputs E1 to E$z$ to which each of the coincidence gates Z1 to Z$p$ is connected, is equal to the number of 1-bits included in the $p$-bit binary code of the second address part corresponding to the bistate devices A1 to A$p$ respectively. These numbers are called $k1$, $k2$ . . . $kp$ respectively. Each of these first inputs E1 to E$z$ is directly connected to one input of a two-input coincidence gate U1 to U$z$ and is connected to one input of a two-input coincidence gate V1 to V$z$ via an inverter I1 to I$z$.

The 1-outputs of the bistate devices D1 to D$z$ of the second address register AR2 are connected to the $z$ second inputs F1 to F$z$ respectively of the comparison device CD. Each of these second inputs F1 to F$z$ is directly con- the above two-input coincidence gates U1 to U$z$ and is connected to the other input of the corresponding one of the two-input coincidence gates V1 to V$z$ via one of the inverters J1 to J$z$.

The outputs of the $z$ pairs of gates U1, V1 . . . U$z$, V$z$ constitute the inputs of the two-input mixers R1 to R$z$ respectively and the outputs of these mixers constitute $z$ inputs $r1$ to $rz$ of the $z$-input coincidence gate G9. The output of this coincidence gate G9 is connected to the inverter I3 the output $c$ of which constitutes a first input of the three-input coincidence gate G10. The output of the pulse source PS is connected to a second input of this three-input coincidence gate G10, the third input of which is connected to the 1-output of the start bistate device BS1. The 0-input and the 1-input of this bistate device BS1 are connected to the rest and start terminals $st0$ and $st1$ respectively.

The input of the first address register AR1 is connected to the output of the $p$-input mixer M5 which is connected to the outputs $z1$ to $zp$ of the coincidence gates Z1 to Z$p$.

The above described system operates as follows. At the start of a selecting operation a reset pulse is applied to the reset inputs $st0$ of the storage device SD1, the address registers AR1 and AR2, the start bistate device BS1 and the binary pulse counter PC which are thus reset in their 0-condition if they are previously not in that condition. Due to the fact that the bistate devices A1 to A$p$ and D1 to D$z$ are brought in their 0-condition, the first and second inputs E1 to E$z$ and F1 to F$z$ of the comparison device CD are all deactivated so that the outputs $r1$ to $rz$ of all the coincidence gates V1 to V$z$ are activated. Hence also the outputs of the coincidence gate G9 is activated so that the coincidence gate G10 is blocked via the inverter I3. This coincidence gate is moreover blocked due to the bistate device BS1 being in its 0-condition.

The first and the second address parts of the selecting address are then stored in the first and second address registers AR1 and AR2 respectively. By means of the first address part, the access selector AS selects the corresponding row in the memory matrix MM and reads out the conditions of the $p$ bistate devices included in this selected row. These conditions are stored in the corresponding $p$ bistate devices A1 to A$p$ of the storage device SD1. In the second address register AR2 a distinct set of $k(k=k1,k2$ . . . $kp)$ bistate devices, among the $z$ bistate devices D1 to D$z$ are brought in their 1-condition, so that $k$ inputs are then activated among the $z$ second inputs F1 to F$z$ of the comparison device CD, whereas the remaining $z$–$k$ second inputs remain deactivated. Due to this, the second inputs of $k$ coincidence gates among the group of $z$ coincidence gates U1 to U$z$ are activated and the second inputs of $z$–$k$ coincidence gates among the group of $z$ coincidence gates V1 to V$z$ are also activated. It should be noted that as soon as the second address part is stored in the second address register AR2, the output of the coincidence gate G9 is deactivated. Indeed, at least one of the second inputs F1 to F2 is activated, whereas all the first inputs E1 to E$z$ are deactivated so that at least one of the outputs $r1$ to $rz$ is deactivated. Hence the output $c$ of the inverter I3, or the input $c$ of the coincidence gate G10, is activated.

A start pulse is then applied to the 1-input $st1$ of the start bistate device BS1. Due to this and since the input $c$ of the coincidence gate G10 is also activated, the pulse source PS applies, via this coincidence gate, a pulse to the input of the binary pulse counter PC which is thus brought in its first position wherein the output $p''_1$ is activated.

When the bistate device A1 is in its 0-condition the output $z1$ of the coincidence gate Z1 remains deactivated at the moment its input $p''_1$ becomes activated so that also none of the $z$ first inputs E1 to E$z$ of the comparison device CD is activated and that the input $c$ of the coincidence gate G10 remains activated. Due to this the pulse source PS applies a second pulse to the pulse counter PC through the coincidence gate G10 and a comparison operation involving the bistate device A2 is started. When this bistate device is in its 0-condition another pulse is applied by the pulse source PS to the pulse counter PC, etc.

When, however a bistate device, e.g. the bistate device A1, is in its 1-condition the output $z1$ of the coincidence gate Z1 becomes activated at the moment the output $p''_1$ of the pulse counter PC is activated. A distinct set of $k1$ first input is then activated among the $z$ first inputs E1 to E$z$ of the comparison device CD, whereas the remaining $z-k1$ first inputs remain deactivated. Due to this, $k1$ first inputs among the first inputs of the $z$ coincidence gates U1 to U$z$ and $z-k1$ first inputs among the first inputs of the $z$ coincidence gates V1 to V$z$ are activated. It is clear that only when the code of the second address part stored in the second address register AR2 and appearing at the second input terminals F1 and F$z$ corresponds with the code appearing at the input terminals E1 to E$z$, the output of one gate is activated in each of the $z$ pairs of gates U1, V1 to U$z$, V$z$. Hence, only in this case, the $z$ inputs $r1$ to $rz$ and consequently also the output of the coincidence gate G9 are activated. The input $c$ of gate G10 is then deactivated so that the shifting operation is stopped.

It should be noted that each time a 1-condition is detested in the bistate devices A1 to A$p$ the corresponding output lead $z1$ to $zp$ is activated at the moment when the counter PC is stepped. Each time, the output of the mixer M5 is activated and a 1-bit is added to the code of the first address part stored in the first address register AR1. This first address part is thus transformed into a new selecting address in the same manner as described in relation to FIG. 1.

In the above described embodiments the conditions of the bistate devices A1 to A$p$ are successively compared with the conditions of the bistate devices B1 to B$p$ respectively. Obviously one may also design a selecting system which performs this comparison operation in a parallel manner.

While the principles of the invention have been described above in connection with specific apparatus, it is to be clearly understood that this description is made only by way of example and not as a limitation on the scope of the invention.

I claim:

1. A data processing circuit comprising means for identifying each item of stored data by an address having two parts, two register means for separately storing the first and second parts of each address received by said data processing circuit, memory means comprising a plurality of bistable devices, each of said devices representing a corresponding one part of each of said addresses, means responsive to a storage of the other part of an address in one of said registers for selecting at least one of said bistable devices to complete the address, means for comparing the selected devices with the address stored in the other of said registers, and means responsive to said comparing means for modifying the address stored in said registers until a parity is found between said stored address and said selected device.

2. The data processing circuit of claim 1 wherein said memory means contains $n$ number of words, the first part of each address consists of $m$ code possibilities where $m<n$, said selecting means selects $p$ number of said bistable devices, wherein the number $n$ is much smaller than the product $mp$.

3. The data processing circuit of claim 1 wherein said first register means comprises a counter means for driving said counter over $q$ number of steps to provide a new selecting address when said parity is found between said selected device and said second part of said address.

4. The data processing circuit of claim 3 wherein said memory means contains $n$ number of words and means responsive to said new selecting address for selecting any of said words.

5. The data processing circuit of claim 1 wherein said selecting means selects $p$ number of bistable devices and said comparing means compares the state of said $p$ number of devices with the data stored in said second register.

6. The data processing circuit of claim 5 and means associated with said memory comprising a first storage device having $p$ number of individual storage devices, means responsive to selection of said bistate devices for transferring the data conditions of said selected bistate devices to said first storage device, and means whereby said comparing means compares the data stored in said second register with the data stored in said first storage device.

7. The data processing circuit of claim 6 wherein said comparison means comprises a translating device, a second storage device and a comparison device, said translating device being coupled between said second address register and said second storage device for translating the code of the second address part stored in said second address register into a $p$-bit code, said $p$-bit code being then stored in said second storage device, said second storage device comprising a third set of bistate devices, and means for switching each third bistate device into a predetermined state for a corresponding second address part out of said $p$ possible second address parts, said comparison device being arranged between said first and second storage devices, said first and second storage devices being shift registers coupled to a pulse source for generating shift pulses and forming part of shifting means.

8. The data processing circuit of claim 7 wherein said comparison device includes first and second comparison bistate devices which form part of said first and second shift registers respectively, and first, second and third two-input coincidence gates, means whereby the inputs of said first coincidence gate are connected to the 0-outputs of said first and second comparison bistate devices, the inputs of said second coincidence gate are connected to the 1-outputs of said first comparison bistate device and to the 0-output of said second comparison bistate device, the inputs of said third coincidence gate are connected to the 1-outputs of said first and second comparison bistate devices, means responsive to the outputs of said first, second and third coincidence gates for controlling said shifting means in such a manner that when the output of said first or second coincidence gate is activated, said shifting means are operated so as to shift said first and second shift registers by one position, whereas when the output of said third coincidence gate is activated said shifting means are stopped.

9. The data processing circuit of claim 8 wherein the outputs of said second and third coincidence gates are connected to one input of a fourth two-input coincidence gate, the other input of which is connected to the output of a delay unit which provides a delay smaller than the time interval between two successive shift pulses generated by said pulse source and which is operated each time a shift pulse is applied to said first and second shift registers, and the output of said fourth two-input coincidence gate is connected to the input of said first address register which is arranged as a binary counter.

10. The data processing circuit of claim 9 and a pulse counting binary counter for counting *p* number of steps, means including a start bistate device which is triggered into its 1-condition at the start of a selecting operation, means for applying the output of said pulse source to the first input of a three-input coincidence gate, the second input of which is connected to the first output of said pulse counting binary counter, means for deactivating said first output when said pulse counting binary counter reaches its *p*th position, the third input of which is connected to the output of a fifth two-input coincidence gate, the output of said three-input coincidence gate being connected to the shift inputs of said first and second shift registers, the one input of said fifth two-input coincidence gate being connected to the 1-output of said start bistate device, and the other input of said fifth coincidence gate being connected to the output of a second two-input OR gate which is connected to the outputs of said first and second coincidence gates.

11. The data processing circuit of claim 10 wherein said pulse counting binary counter has two outputs, the second output of said binary counter being activated when said counter has reached its *p*th position, said second output being connected to one input of a sixth two-input coincidence gate, the other input of which is connected to the output of said second two-input OR gate, the output of said sixth two-input coincidence gate being connected to one input of a third two-input OR gate, the other input of which is connected to the output of a seventh two-input coincidence gate, the inputs of which are connected to the 0-output of said first comparison bistate device and to the 1-output of said second comparison bistate device, the output of said third OR gate being connected to the 1-input of an error bistate device and to one input of a fourth two-input OR gate, the other input of said fourth OR gate being connected to the output of said third coincidence gate, and the output of said fourth OR gate being connected to the 0-input of said start bistate device.

12. A central control device for commanding any of a plurality of associated equipments to perform predetermined functions responsive to a stored program, in combination therewith said control device comprising means for selecting a predetermined part of said program responsive to a two-part address, one part of said address identifying one of said equipments, the other part of said address identifying the function expected of said one equipment, means for comparing said two parts to determine whether said one equipment can perform said expected function, and means responsive to said comparing means detecting a failure to match for altering said first part in order to produce a match.

No references cited.

PAUL J. HENON, *Primary Examiner.*

ROBERT C. BAILEY, *Examiner.*

O. E. TODD, *Assistant Examiner.*